(12) United States Patent
Moore

(10) Patent No.: US 6,717,719 B1
(45) Date of Patent: Apr. 6, 2004

(54) COHERENT OPTICAL BEAM COMBINATION USING DOUBLE-COATED GLASS MIRRORS/MIRROR PAIRS

(75) Inventor: Gerald T. Moore, Albuquerque, NM (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 327 days.

(21) Appl. No.: 09/682,433

(22) Filed: Oct. 1, 2001

(51) Int. Cl.[7] .................... H01S 3/091; H04J 14/00; G02B 6/293
(52) U.S. Cl. .................... 359/340; 359/334; 359/341.2; 372/18; 372/93
(58) Field of Search .................... 359/127.1, 129.1, 359/334, 340, 341.2, 341.32, 124, 116; 372/6, 18, 93

(56) References Cited

U.S. PATENT DOCUMENTS

| | | | |
|---|---|---|---|
| 5,434,875 A | * 7/1995 | Reigh et al. | 372/25 |
| 5,546,222 A | * 8/1996 | Ploessman et al. | 359/346 |
| 5,978,116 A | * 11/1999 | Wu et al. | 359/124 |
| 6,144,677 A | * 11/2000 | Kome et al. | 372/6 |
| 6,310,715 B1 | * 10/2001 | Moore | 359/334 |
| 6,337,770 B1 | * 1/2002 | Chang et al. | 359/495 |
| 6,455,841 B2 | * 9/2002 | Zhou et al. | 250/425 |
| 6,498,680 B1 | * 12/2002 | Zhou et al. | 359/487 |

FOREIGN PATENT DOCUMENTS

JP  9230166  * 9/1997

OTHER PUBLICATIONS

Moore, G.T.; Applied Optics, vol. 41, # 301 pp. 6399–6409, Oct. 20, 2002.*

Tee et al; Proc. of SPIE, vol. 3865, pp 19–29, Jul. 23, 1999; Abstract only.*

L. Bartelt–Berger, U. Brauch, A. Giesen, H. Huegel, and H. Opower, "Power–scalable system of phase–locked single–mode diode lasers," Appl. Opt. 38, 5752–5760 (1999).

J. R. Leger, M. L. Scott, and W. B. Veldkamp, "Coherent addition of AlGaAs lasers using microlenses and diffractive coupling," Appl. Phys. Lett. 52, 1771–1773 (1988).

G. T. Moore, "A model for diffraction–limited high–power multimode fiber amplifiers using seeded stimulated brillouin scattering phase conjugation," IEEE J. Quantum Electron. 37, 781–789 (2001).

W. H. Press, B. P. Flannery, S. A. Teukolsky, and W. T. Vetterling, *Numerical Recipes in FORTRAN*, Second Edition (Cambridge University Press, Cambridge, 1992), p. 406.

* cited by examiner

Primary Examiner—Nelson Moskowitz
(74) Attorney, Agent, or Firm—James M. Skorich; Kenneth E. Callahan

(57) ABSTRACT

A multiplexing device using N-stages of double-coated planar glass mirrors or coated mirror pairs to coherently combine the output of $2^N$ narrow-bandwidth, diffraction-limited, polarized, and phase-locked optical beams to produce a single diffraction-limited beam with a power close to $2^N$ times that of a single beam. A multiplexer system is also disclosed to control the relative phases of the $2^N$ beams used in conjunction with the multiplexing device.

11 Claims, 6 Drawing Sheets

COHERENT OPTICAL BEAM COMBINATION USING DOUBLE-COATED GLASS MIRRORS/MIRROR PAIRS

FEDERAL RESEARCH STATEMENT

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF INVENTION

The present invention is a technique for coherent beam combination of the output of multiple phase-locked optical amplifiers or lasers, using double-coated glass mirrors or mirror pairs in a non-planar configuration.

The peak far-field intensity produced by M phase-locked optical amplifiers or lasers of equal power can ideally be M times as great as the intensity produced by the same sources with random relative phases. This fact has motivated a great deal of work on achieving coherently phased optical sources. An example is a device that phases the output of 19 phase-locked diode lasers by sending this light through single-mode optical fibers. (L. Bartelt-Berger, U. Brauch, A. Giesen, H. Huegel, and H. Opower, Power-scalable system of phase-locked single-mode diode lasers, Appl. Opt. 38, 5752–5760 (1999)) Piezoelectric transducers are used to stretch the fibers so as to shift the optical phases. The optimal phases are maintained by means of an electronic feedback circuit.

Phase control is only one aspect of the problem of coherent beam combination. Generally the far field of a phased array of emitters has power distributed partially into side lobes, so that the central peak contains only a fraction of the total power. To some extent this problem can be reduced by the use of microlens arrays which collimate the light from the individual sources when it has diffractively spread almost to the point of overlapping. (J. R. Leger, M. L. Scott, and W. B. Veldkamp, Coherent addition of AlGaAs lasers using microlenses and diffractive coupling, Appl. Phys. Lett. 52, 1771–1773 (1988). This increases the filling factor of the array, which is the ratio of the sub-beam diameters at their waists to the distance between beams. A large filling factor results in a greater fraction of far-field power in the central lobe. However, a microlens array does not produce a Gaussian beam, and the beam quality is not diffraction limited.

In a pending patent application (Ser. No. 09/558,527 filed May 26, 2000, (now U.S. Pat. No. 6,310,715), allowed and hereby incorporated by reference) a technique was described using a stack of birefringent crystal plates to produce a coherently combined (multiplexed) polarized Gaussian beam which is diffraction limited. The present invention serves the same function and is conceptually similar, but requires only coated glass mirrors, which can be economically manufactured with large dimensions of extremely transparent well-tested materials such as fused silica or Infrasil. By contrast, large highly birefringent crystals may be unavailable, expensive, or subject to damage at high optical power. Other advantages of the present invention based on glass mirrors will be pointed out below.

SUMMARY OF INVENTION

The present invention is a multiplexing device for coherently combining the output of $2^N$ narrow-bandwidth, diffraction-limited, polarized, and phase-locked optical beams to produce a single diffraction-limited beam with a power close to $2^N$ times that of a single beam. The multiplexing device is comprised of N double-coated planar mirrors or coated mirror pairs, the top coating being designed to reflect the s-polarization and the bottom coating being designed to reflect the p-polarization or arbitrary polarization of narrow-bandwidth light incident at a selected wavelength and non-normal angle of incidence. The preferred angle of incidence using the coated mirror pairs is the Brewster angle. The mirror thickness or gap between paired mirrors is selected so that the walkoff between s and p waves increases by a factor of $\sqrt{2}$ in successive stages of reflection. The mirrors are arranged in a non-planar configuration. The $2^N$ incident beams are arrayed transversely in a particular configuration and propagate all in the same direction. A multiplexer system is also disclosed that in combination with the multiplexing device controls the relative phases of the incident beams using an electronic feed-back circuit which monitors the power of certain undesired emitted beams and minimizes their power by phase adjusters such as piezoelectric fiber stretchers.

Other aspects and advantages of the present invention will become apparent from the following detailed description, taken in conjunction with the accompanying drawing, illustrating by way of example the principles of the invention.

DETAILED DESCRIPTION

Figure 1:
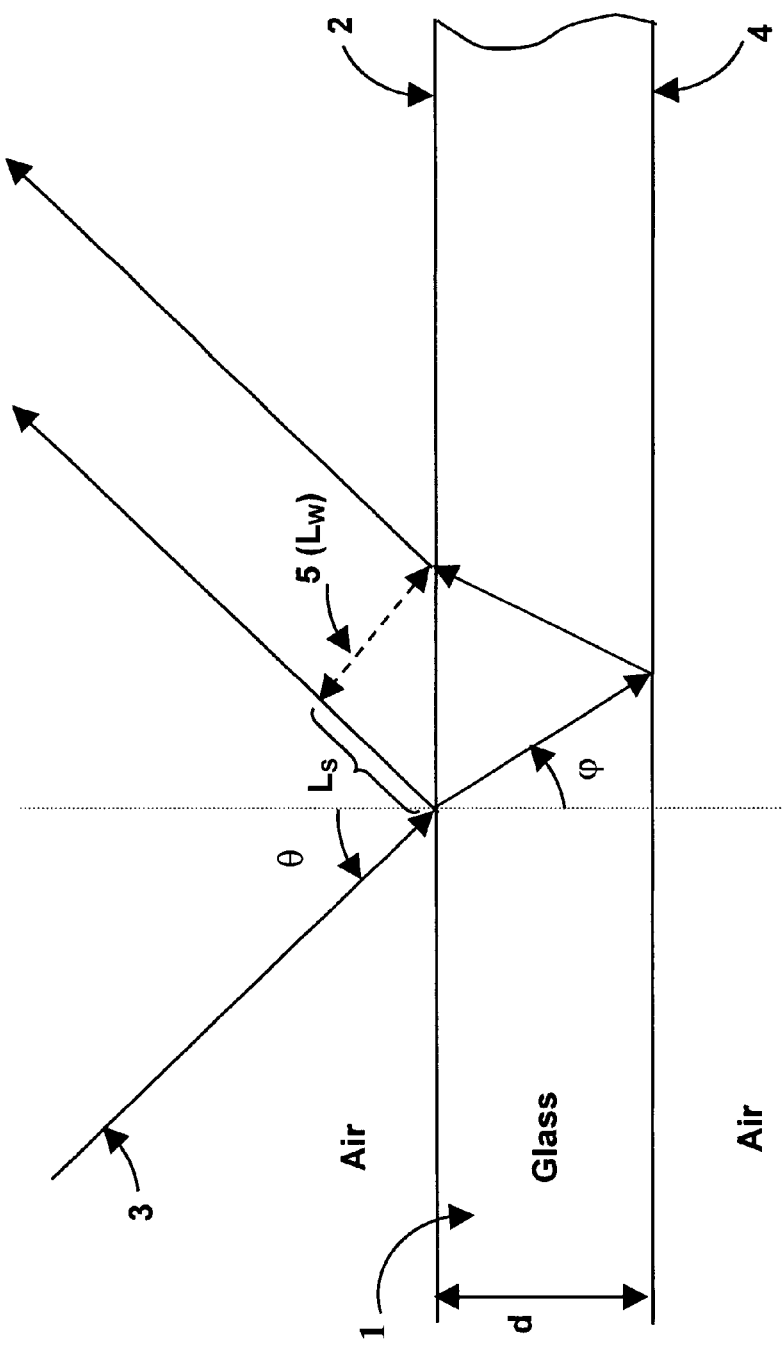
FIG. 1 illustrates reflection from a double-coated glass mirror.

The present invention uses an N-stage multiplexing device comprised of double-coated and specially configured glass mirrors or mirror pairs, for coherently combining (multiplexing) the output of $M=2^N$ narrow-bandwidth, diffraction-limited, polarized, and phase-locked optical beams to produce a single diffraction-limited beam with a power close to M times that of a single beam. Such beams could, for example, be the output of M fiber amplifiers seeded by a common laser back-end master oscillator (BMO), with the output ends of the fiber amplifiers configured in a particular array. Phase control of the beams is maintained by an electronic servo which monitors the optical power emitted into certain undesired beams and minimizes this power by means of phase adjusters (e.g., piezoelectric fiber stretchers) on each amplifier. In one application using multimode fiber, the output of a front-end master oscillator (FMO) is injected counter to the direction of the BMO light, the latter being down-shifted in frequency with respect to the former by the Stokes shift for stimulated Brillouin scattering (SBS). The FMO light is then de-multiplexed by the mirrors, enters the fibers, and experiences amplifier gain. The BMO light undergoes both SBS and amplifier gain, and can emerge from the fibers as the phase-conjugate of the FMO light. Phase conjugation simplifies the spatial alignment of the device, though active phase control is still necessary for multiplexing. In another application beam multiplexing is done with the output of single-mode polarization-preserving fiber amplifiers, operating below the power threshold for SBS generation and without an FMO.

The multiplexing device is comprised of a non-planar configuration of N double-coated planar glass mirrors or mirror pairs. It coherently combines $2^N$ phase-locked laser beams into a single diffraction-limited beam. Light beams arrayed transversely in a certain pattern and propagating in a common direction are incident on the mirrors or mirror pairs at a non-normal angle of incidence (typically about 50° to 55°. In one configuration (double-coated planar glass mirrors) the front surface of the mirrors is coated to highly transmit light polarized in the plane of incidence (p-polarization) and to highly reflect light polarized orthogonally to the plane of incidence (s-polarization). The back surface is coated to highly reflect p-polarized or arbitrarily polarized light. The reflected p-polarized light leaving the mirror is displaced from the reflected s-polarized light by an amount proportional to the mirror thickness d. In the direction of multiplexing the thickness of successive mirrors and the lateral beam displacement of p-polarized light increases by a factor of √2 at each stage.

In another configuration (coated mirror pairs) pairs of glass mirrors are used, with the mirrors in each pair separated by an air gap of thickness D. In this configuration light is first incident on an air-glass interface coated to highly transmit the p-polarization and to highly reflect the s-polarization. It is preferable that the light be incident at the Brewster angle, so that the p-polarized light is transmitted without reflection through the uncoated back surface. It is also preferable that the thickness d of this mirror be small in order to minimize astigmatism. The second mirror of the pair is coated on its front surface to highly reflect p-polarized or arbitrarily polarized light. The gap thickness D in successive mirror pairs is chosen such that the lateral beam displacement of p-polarized light increases by a factor of √2 at each stage. In either configuration successive mirrors or mirror pairs are arranged non-collinearly such that successive planes of incidence have 45° relative orientation. The resulting beam path is quasi-helical.

Double-coated planarglass mirrors. Consider a flat glass 7 plate of thickness d and refractive index n, as shown in FIG. 1. This plate has optical coatings, of negligible thickness compared to d, applied to both surfaces to form a mirror. The coating applied to the top surface 2 is designed to reflect the s-polarization (perpendicular to the plane of incidence) of narrow-bandwidth light 3 incident at angle θ, while transmitting the p-polarization (parallel to the plane of incidence). The angle of refraction φ in the glass is determined by Snell's law, sin θ=n sin φ. The coating on the bottom surface 4 is designed to reflect light of p or arbitrary polarization. Incident light 3 linearly polarized at 45° with respect to the plane of incidence is split into two beams of equal power and orthogonal polarization by this mirror. The lateral beam displacement 5 or walkoff is given by $L_W$=2 d tan φ cos θ (the length of the dashed line 5 in FIG. 1).

Figure 2:
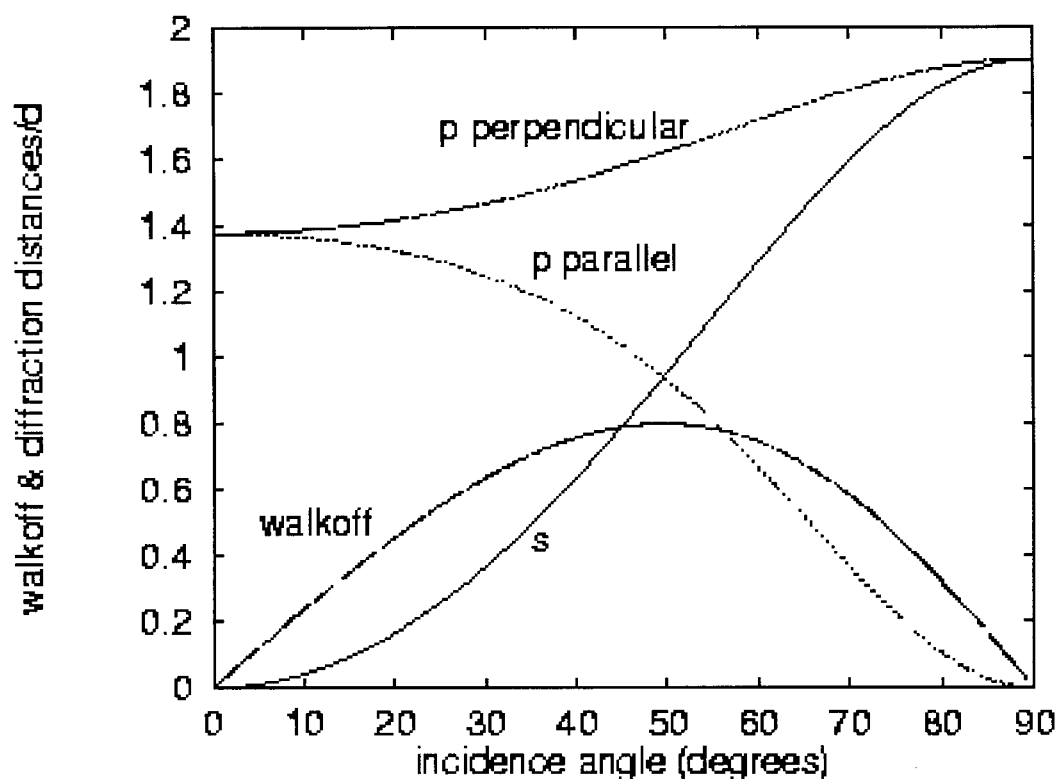
FIG. 2 is a plot of the walkoff and diffraction distances versus incident angle for n=1.45.

Three other lengths of interest are the equivalent free-space propagation distances from the point of incidence to the dashed line. $L_S$ is the distance along the upper reflected ray from the mirror surface 2 to the dashed line 5. It is given by $L_S$=2 d tan φ sin θ for the s-polarization. The next two lengths do not correspond to any physical lengths shown in FIG. 1. They are defined as: $L_{p\perp}$=2 d/n cos φ for the p-polarization spatial dimension perpendicular to the plane of incidence and $L_{p\|}$=2 d cos²φ/n cos³φ for the p-polarization spatial dimension parallel to the plane of incidence. These four lengths are shown as a function of θ in FIG. 2 for n=1.45. Physically, light reflected from the lower surface undergoes diffractive spreading between the point where it enters the top surface and the point where it leaves the top surface (lower end of the dashed line 5). This amount of diffraction would occur in the lengths L⊥ and $L_{p\|}$in air. These distances differ for the two transverse dimensions because the beam becomes elliptical in cross section inside the glass. This difference represents astigmatism.

Maximum walkoff $L_W$=2 d $[n(n^2 1)^{1/2}]$ occurs for cos φ=$(11/n^2)^{1/4}$, corresponding to θ=50°, $L_w$=0.8 d, for n=1.45. The inequality of $L_{p\perp}$ and $L_{p\|}$ represents astigmatism, which is undesirable for coherent beam combination of tightly focused beams. Coherent beam combination of two beams is the time reversal of the situation shown in FIG. 1. Then the combined beam can be made linearly polarized in either of two states-polarized at 45° with respect to the plane of incidence by choosing suitable values for the relative phase of the s and p beams.

Figure 3:
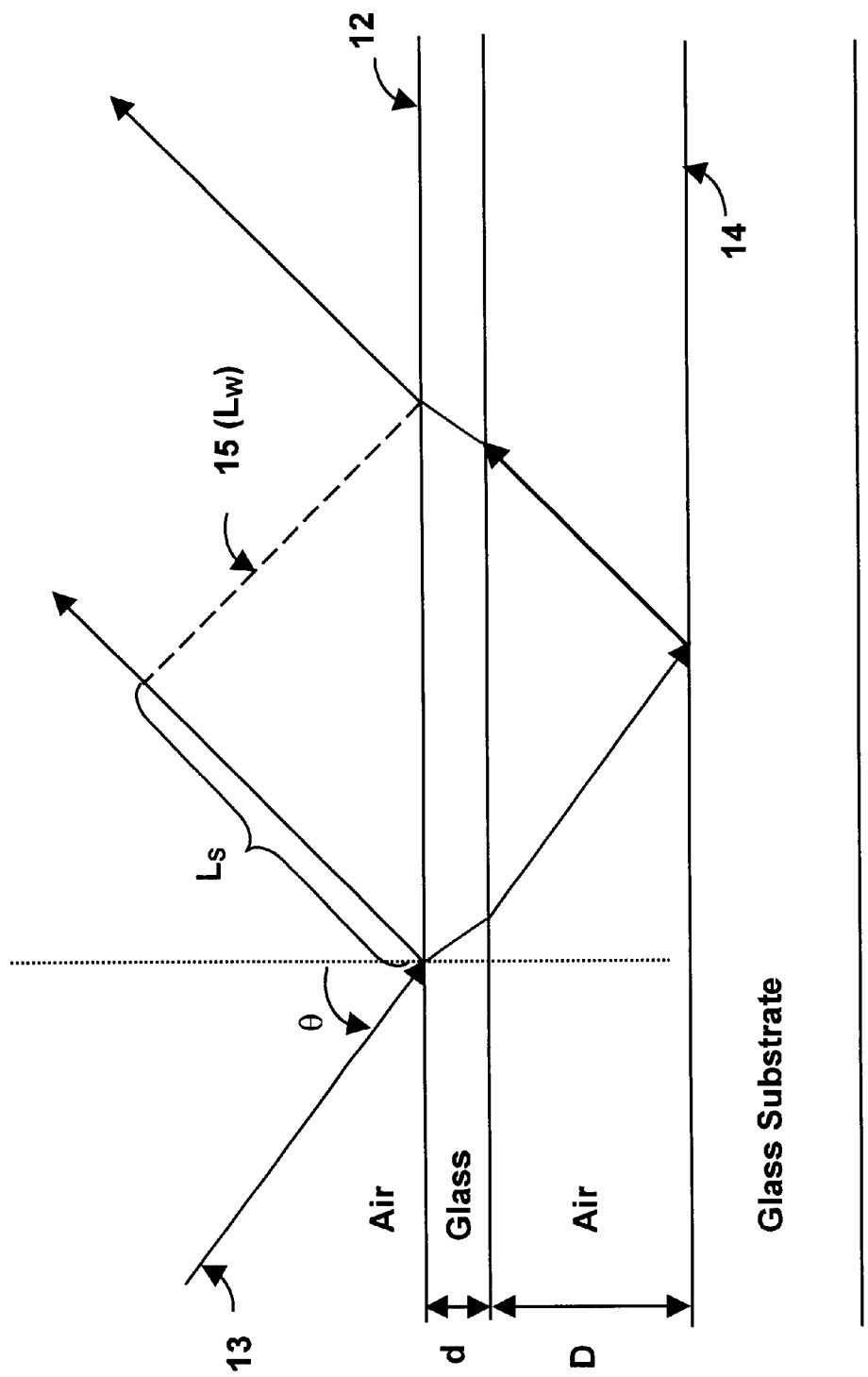
FIG. 3 illustrates reflection from a mirror pair.

Coated Mirror Pairs. FIG. 3 shows an alternative configuration in which a mirror pair is used consisting of two coated glass plates 12, 14 separated by an air gap D.

The coatings are designed for the same purpose as above and are applied to the top surfaces. The thickness of the lower mirror is immaterial, since light is not transmitted by the coating. It is now advantageous to choose θ to be the Brewster angle (θ=55° for n=1.45) so that no coating is needed on the bottom surface of the upper mirror.

The four distances defined above are now given by:

$L_W$=2d tan φ cos θ+2 D sin θ, (15)

$L_S$=2d tan φ sin θ+2 D tan θ sin θ, $L_{p\perp}$=2d/n cos φ+2 D/cos θ, and

L=2 d cos² θ/n cos³ φ+2 D/cos θ.

The objective is to make das small as is consistent with mechanical rigidity, so as to minimize astigmatism, while increasing Dfor successive mirror pairs in such a way as to increase $L_W$ by a factor of √2 at each stage of the multiplexing. Using the same d for each mirror pair could reduce manufacturing cost, since all stages can use the same mirror thickness. Spacing gaskets around the apertures can be used to fix D for each stage.

Figure 4:
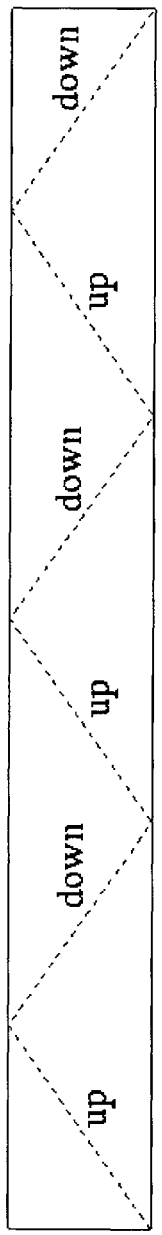
FIG. 4 is a cut-and-fold template for non-planar beam path providing a simple way to visualize the ray directions.

The beam path (ignoring walkoff) for a series of mirrors or mirror pairs for either multiplexing device (the double coated planar glass mirrors or the coated mirror pairs) can be visualized by folding a strip such as shown in FIG. 4 along the indicated dashed lines, so that the normals of successive planes are at 45°. The beam path corresponds to the non-planar quasi-helical path of the folds. The planes of incidence correspond to the triangles. Contrary to the situation with a crystal stack (Ser. No. 09/558,527-filed May 26, 2000), rotations of the walkoff direction are all of the same handedness. This is because of the image reversal caused by reflection. Although FIG. 4 provides a simple way to visualize the ray directions, it gives the incorrect impression that the optical path lengths between reflections must be equal. This is not necessarily the case, and cannot be the case if walkoff is taken into account.

Figure 5:
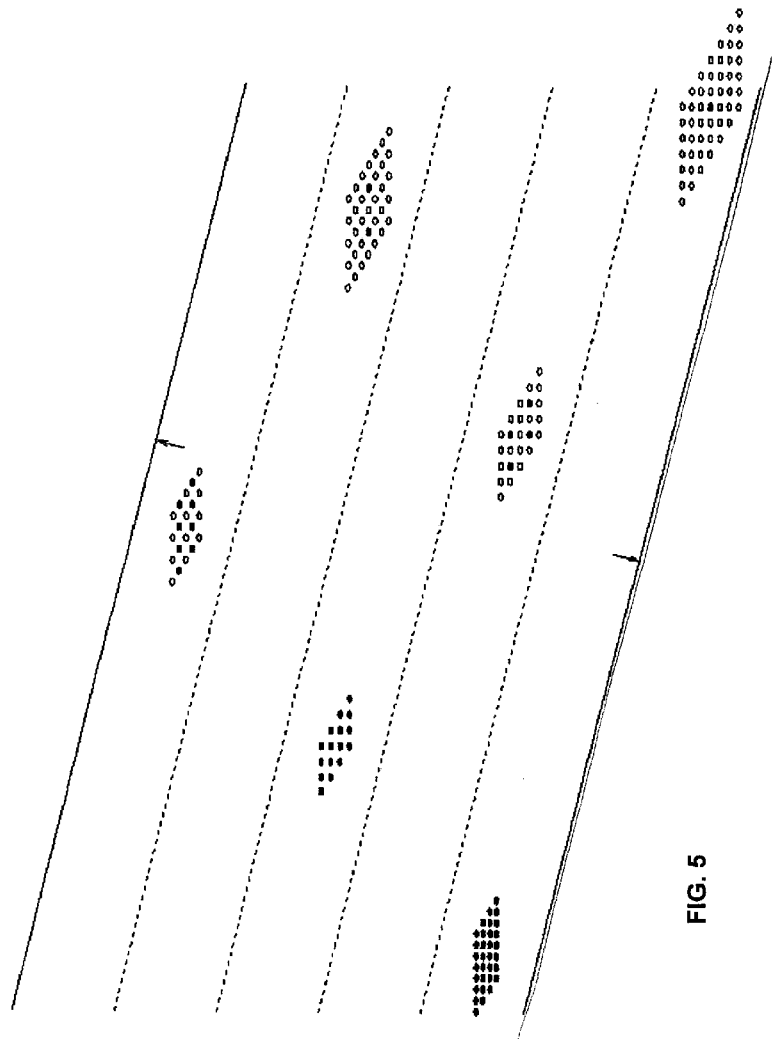
FIG. 5 is a template for a model beam multiplexer.

FIG. 5 is a template for a model beam multiplexer that may be used to obtain a better idea of the physical representation of the device. It can be photocopied onto a transparency, cut along the solid lines, folded along the dashed lines with creases protruding, aligned by the arrows, and the opposite edges taped to form a pentagonal cylinder. The interior surfaces are mirror planes for s-polarization. Beams spiral around inside the cylinder while traveling in the axial direction. The ellipses are intersections of beams with mirror surfaces. Undesired beams are open ellipses. There is no mirror where the fully multiplexed beam leaves the device.

Figure 6:
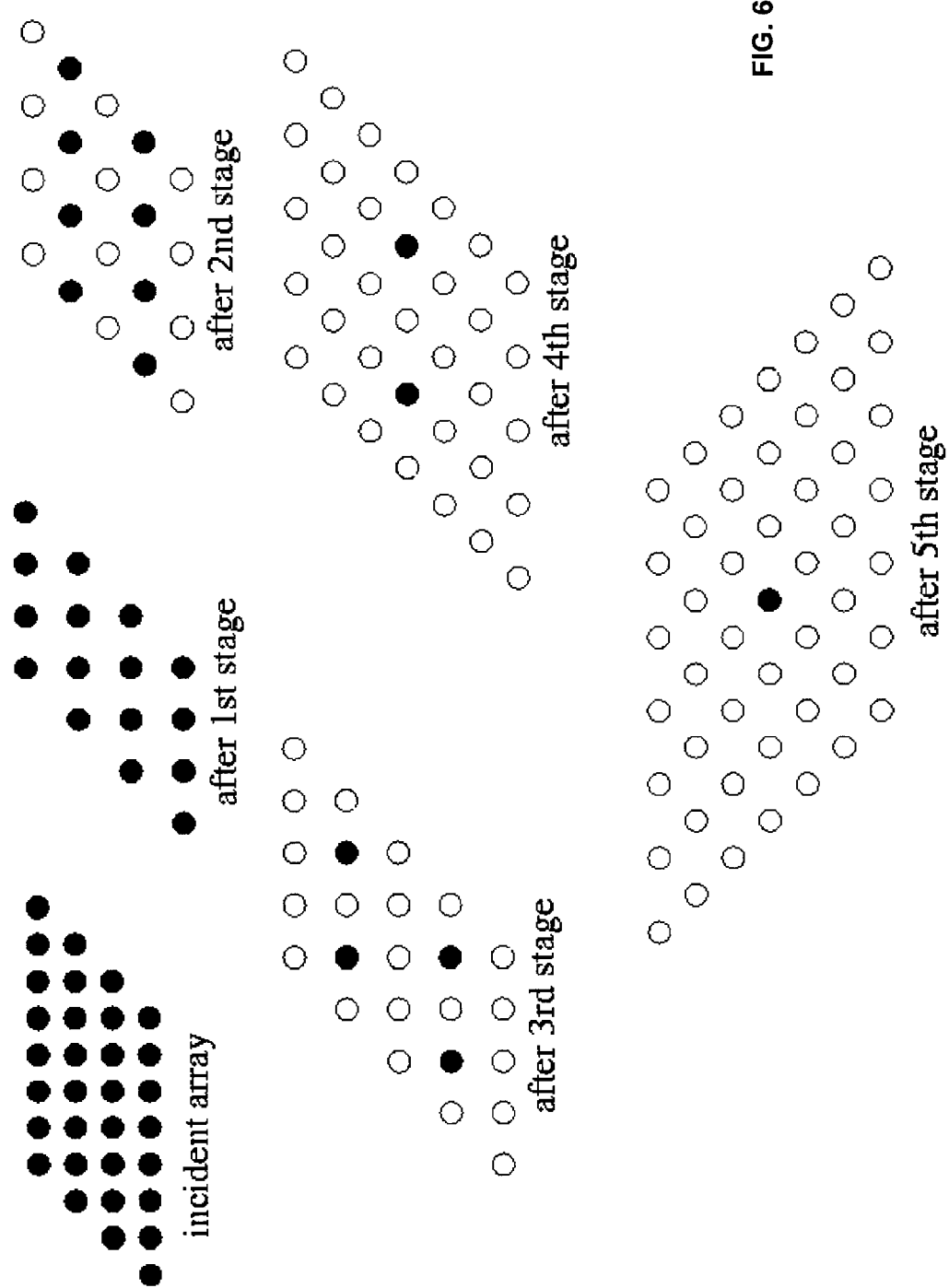
FIG. 6 shows the transverse beam positions for multiplexing 32 beams using five stages of reflection.

FIG. 6 shows the transverse beam positions for multiplexing 32 ($2^N$ for N=5) beams using five (N) mirror stages of reflection. The filled circles show the beam positions under conditions of optimal phasing. These are also the transverse beam positions when demultiplexing a beam propagating through the device in the reverse direction. The open circles show the positions of additional beams generated when multiplexing under conditions of random phasing. For convenience the arrays are shown oriented such that walkoff in each case is to the right at the next stage. In actuality the arrays are not co-planar. The incident array has alternate diagonal columns-polarized horizontally (p-polarization) and vertically (s-polarization). The incident array could represent the ends of phase-locked fiber amplifiers or a magnified image thereof. After passing through the multiplexer, there are 49 beams, only the central one of which is desired. The unwanted beams can largely be eliminated by choosing proper phases for the input beams using an electronic feedback loop. A computer algorithm, also described in (Ser. No. 09/558,527-filed May 26, 2000), was developed that determines the needed phase relationships by monitoring and minimizing the power in the 16 unwanted beams at the vertices of the corner rhombuses shown after the fifth stage, plus the two beams shown displaced horizontally by two spots from the central spot.

The 30 phase constraints needed to concentrate the output power into the central spot are determined successively by finding minima of one two, or three variables using Powell's method (W. H. Press, B. P. Flannery, S. A. Teukolsky, and W. T. Vetterling, *Numerical Recipes in FORTRAN*, Second Edition (Cambridge University Press, Cambridge, 1992), p. 406]. For example, each of the four unwanted beams at the corners of the array receives light from two input beams, so its power can be minimized by an appropriate choice of the relative phase of these two input beams, a single variable. Although this algorithm monitors the power in only 18 of the undesired beams, all 48 of the undesired beams are suppressed when the optimal phase constraints have been imposed. Other algorithms which monitor the power in additional unwanted beams may be advantageous, but have not yet been demonstrated. Although monitoring the power in the unwanted beams does not provide enough information to specify the polarization of the multiplexed output beam, the additional phase constraint needed to do this can be obtained by passing the multiplexed beam (or a portion thereof) through a polarization beam splitter and minimizing the power transmitted through one port of the beam splitter by means of a feed-back loop.

Figure 7:
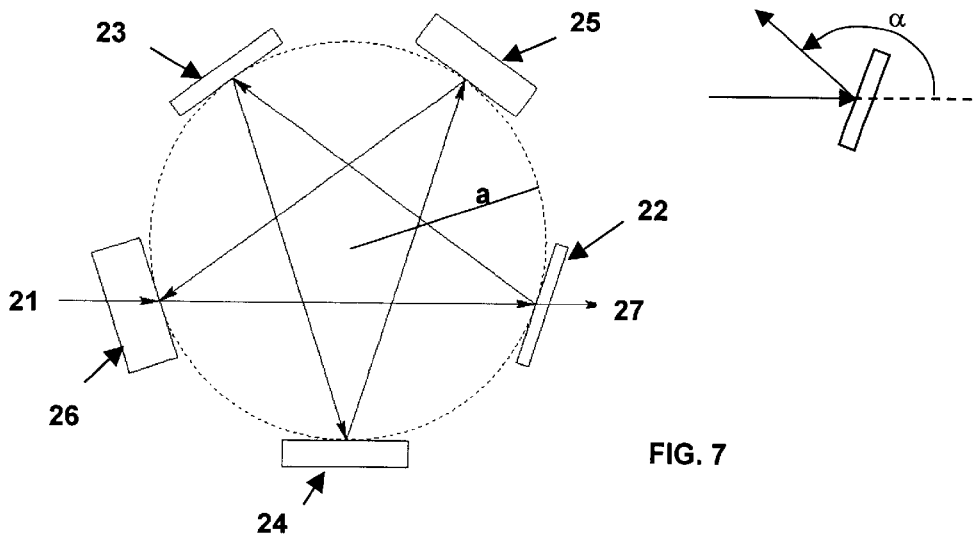
FIG. 7 is an end-on view of the multiplexer with parallel input and output beams showing typical s-polarization ray trajectory.

FIG. 7 shows an end-on view of a multiplexer arranged in a convenient configuration where the output ray direction after five reflections is parallel to but displaced with respect to the input ray direction. A typical s-polarized ray trajectory is also shown. Input ray 21 is reflected off the first mirror 22 and successively off the next four mirrors 23, 24, 25, and 26. The ray then exits the multiplexer 27. Reflections from the different double-coated mirrors or mirror pairs actually occur at different axial positions. The mirrors themselves are also located at different axial positions, so that the input beam does not intercept the thickest mirror and the output beam does not intercept the thinnest mirror. The dashed circle is a guide to the eye, not a physical object. The azimuthal ray direction for the star-shaped figure rotates by an angle α=144° after each reflection. One can relate α to the full ray-deflection angle π−2 θ in the plane of incidence according to cos α=[−1+C−(1+C)/√2]/2, where C=cos (π−2 θ). For the present case, it follows that θ=53.85°, which is close enough to the Brewster angle of glass for high transmission of the p-polarization through the uncoated back surface of the upper mirror in FIG. 3. The axial displacement of successive reflections is 2.4 a. If extended, the parallel input and output rays would have a perpendicular separation of 7.46 a, but in reality they do not get this close. It is worth noting that tight folding of the template in FIG. 4 (by 135° rather than 45°) also produces equalized polarization mixing, but in this case cos α=[−1+C+(1+C)/√2]/2. Reversing the folds in either case reverses the helicity. The fact that the incident and emerging beams in FIG. 7 are shown as being parallel is correct for a 5-mirror multiplexer, but in general this would not be the case.

Multiplexer System. The relative phases of the $2^N$ beams to be combined must be controlled in order for beam combination to occur. Otherwise the number of emerging beams increases to $[2^{(N+1)/2}1]^2$ if N is odd and $(2^{N/2}1)(2^{1+N/2}1)$ if N is even. By monitoring the power emitted into certain of the unwanted emerging beams and minimizing this power by means of an electronic feedback circuit controlling optical phase adjusters, most of the emerging power can be concentrated into a single desired beam.

The $2^N$ beams to be combined must have the correct spatial positions and alignment. This is greatly simplified by using a configuration where these beams are produced by phase-conjugate reflection of a demultiplexed beam from an FMO which has passed through the device in the opposite direction. SBS in multimode fibers can produce the required phase conjugation and can reverse the effects of aberrations and depolarization which may occur during the demultiplexing pass through the device. Laser amplifiers, such as Yb-doped multimode fibers pumped by a diode-laser array, can be used to amplify both the demultiplexed FMO light and the phase-conjugated nonlinearly reflected Stokes radiation. A BMO at the Stokes frequency (G. T. Moore, A model for diffraction-limited high-power multimode fiber amplifiers using seeded stimulated Brillouin scattering phase conjugation, IEEE J. Quantum Electron. 37, 781–789 (2001)) can possibly be used to phase-lock the beams emitted by the different amplifiers, and piezoelectric fiber stretchers can be used to adjust the beam phases to achieve multiplexing. A second similar device can be used to demultiplex the Stokes seed from the BMO for injection into the fiber amplifiers.

Figure 8:
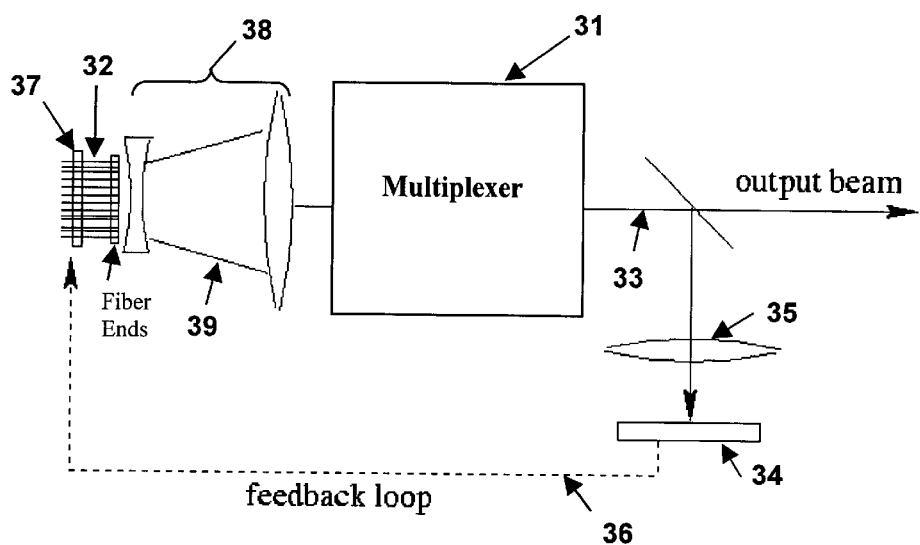
FIG. 8 is a schematic illustration of how the multiplexer would be used for coherent beam combination of multiple fiber amplifiers.

FIG. 8 illustrates schematically how the multiplexer device 37 would be used to combine the outputs 39 of multiple narrow-band phase-locked fiber amplifiers 32. Polarized light from the fiber amplifiers enters the multiplexer device from the left it passes through magnifying optics, represented schematically by the lenses 38. The magnifying optics acts to decrease the angular divergence of the beams while maintaining their mutual parallelism. The relative sizes of elements shown in this figure are not to scale, and the optics 38 and 35 would probably in practice be more complex than single lenses or pairs of lenses. For example, the optics 38 could include a microlens array to increase the filling factor of the beam array. The beams entering the multiplexer should ideally have the same configuration, except the opposite direction of propagation, as beams produced by demultiplexing a single beam going in the reverse direction. Further work is needed to determine acceptable tolerances for misalignment and to develop a technique for holding the fiber ends close together in the correct configuration. The optical beams 39 could be produced by a BMO and a demultiplexer (not shown) before being injected into the fiber amplifiers. The fibers could be single-mode and polarization preserving. Alternatively the fibers could be multimode, but emitting polarized light with good beam quality because of SBS phase conjugation (see Ser. No. 09/558,527). In the latter case, light from an FMO, up-shifted in frequency by the SBS Stokes shift with respect to the BMO, would be injected counter to the direction of the output beam, as illustrated in Ser. No. 09/558,527. A small fraction of the output beam 33 is deflected to a CCD detector array 34. Imaging optics 35 are used to image the plane of the fiber ends onto the detector array, as well as, if necessary, to match the angular divergence of beams within the multiplexer to the angular acceptance of the coatings. The power emitted into undesired beams is monitored and is minimized by an electronic feedback loop 36 driving piezoelectric phase shifters 37 attached to the fibers.

Diffraction causes parallel beams to spread and eventually overlap one another. In order to resolve the multiple unwanted beams and single desired beam after the final stage of multiplexing, it is generally necessary to pass a fraction of the light after the final stage of multiplexing through optics which re-image the plane of the incident array onto a CCD detector. If the incident array consists of the parallel output of identical polarization-preserving fiber amplifiers, the possibility of re-imaging is limited by astigmatism in the multiplexer. The configuration using mirror pairs is preferable, since the maximum astigmatism (the accumulated difference in $L_{p\|}$ and $L_p\perp$) for light that propagates with p-polarization through N stages scales linearly with N. By contrast, the maximum astigmatism using double-coated mirrors of increasing thickness scales exponentially with N for large N. Moreover, the walkoff using mirror pairs, which determines the beam separations, can be made arbitrarily large by increasing the gaps without increasing the astigmatism. Although the gaps do not contribute to astigmatism, they do contribute to make the effective diffractive path length for p-polarized light longer than the path for s-polarized light. Light from one corner of the incident array propagates into the multiplexed beam entirely with p-polarization, while light from the opposite corner propagates into the multiplexed beam entirely with s-polarization. To keep M identical incident beams contributing with the same spatial profile to the multiplexed beam, one can tilt the plane of the incident array to make the total path length for the s-polarization equal to that for the p-polarization. This is done by adjusting the longitudinal positions of the fiber ends. The direction of beam propagation is then not normal to the plane of the fiber ends. A similar tilt of the detector array can be used to help resolve the multiple beams arriving there.

The device can also be used to multiplex the output of $2^N$ single-mode fiber amplifiers phase-locked to a single BMO. A second similar device can be used to demultiplex the BMO beam for injection into the fiber amplifiers. Demultiplexing is accomplished by injecting a single beam into the device in the reverse direction. No FMO or phase-conjugation is used in this application. Therefore, careful beam alignment and minimization of aberrations in the multiplexer is needed. The device using mirror pairs is preferable for this application because it produces less astigmatism.

What is claimed is:

1. A multiplexer system for combining $2^N$ narrow-bandwidth, diffraction-limited, polarized, and phase-locked optical beams into a near diffraction limited coherent optical beam, the multiplexer system comprised of:
    optical phase adjusters for said optical beams;
    multiplexer device means for coherently combining said optical beams;
    means for controlling the optical phase adjusters.

2. The multiplexer system of claim 1, wherein the optical beams are the output of $2^N$ fiber amplifiers seeded by a common laser back-end master oscillator.

3. The multiplexer system of claim 2, wherein the multiplexer device is a non-planar configuration of N double-coated planar glass mirrors.

4. The multiplexer system of claim 2, wherein the multiplexer device is comprised of N coated mirror pairs.

5. The multiplexer system of claim 2, wherein the optical phase adjusters are piezoelectric fiber stretchers.

6. The multiplexer system of claim 1, wherein the optical beams are produced by phase-conjugate reflection of a demultiplexed beam from a front-end master oscillator.

7. The multiplexer system of claim 6, wherein the multiplexer device is a non-planar configuration of N double-coated planar glass mirror device.

8. The multiplexer system of claim 6, wherein the multiplexer device is comprised of N coated mirror pairs.

9. The apparatus of claim 6, wherein the optical phase adjusters are piezoelectric fiber stretchers.

10. A multiplexing device for combining the output of $2^N$ narrow-bandwidth, diffraction-limited, polarized, and phase-locked optical beams to produce a single diffraction limited beam with power about M times that of a single beam, the multiplexing device comprised of a non-planar configuration of N double-coated planar glass mirrors with a top coating designed to reflect s-polarized light of said optical beams, a bottom coating designed for high reflectance at any polarization of said optical beams, and having a mirror thickness such that the walkoff between s- and p-polarized waves increases by a factor of the square root of 2.

11. A multiplexing device for combining the output of $2^N$ narrow-bandwidth, diffraction-limited, polarized, and phase-locked optical beams to produce a single diffraction limited beam with power about M times that of a single beam, the multiplexing device comprised of:
    N coated mirror pairs;
    a top coating on a top mirror of each mirror pair designed to reflect s-polarized light;
    optical beams incident at the Brewster angle;
    an air gap between the mirror pairs, where the air gap in successive mirror pairs is chosen such that the lateral beam displacement of p-polarized light increases by a factor of the square root of 2; and
    a coating on a bottom mirror of each mirror pair designed for high reflectance at any polarization of said optical beams.

* * * * *